(12) United States Patent
Weigl et al.

(10) Patent No.: US 6,513,323 B1
(45) Date of Patent: Feb. 4, 2003

(54) VALVE SEAT DEVICE FOR A METERING VALVE OF AN EXHAUST TREATMENT STATION

(75) Inventors: Manfred Weigl, Viehhausen (DE); Gerhard Wissler, Suenching (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/980,986

(22) PCT Filed: Apr. 3, 2000

(86) PCT No.: PCT/DE00/00999

§ 371 (c)(1),
(2), (4) Date: Apr. 11, 2002

(87) PCT Pub. No.: WO00/66885

PCT Pub. Date: Nov. 9, 2000

(30) Foreign Application Priority Data

Apr. 28, 1999 (DE) .......................... 199 19 426

(51) Int. Cl.[7] ................................. F01N 3/00
(52) U.S. Cl. ................ 60/286; 60/295; 60/298; 60/303; 137/340; 239/128; 239/132; 239/132.3
(58) Field of Search ............... 60/286, 295, 298, 60/320, 301, 303; 137/340; 239/128, 129, 132, 132.1, 132.3

(56) References Cited

U.S. PATENT DOCUMENTS

| | | | | |
|---|---|---|---|---|
| 5,605,042 A | * | 2/1997 | Stutzenberger | 60/286 |
| 6,050,088 A | * | 4/2000 | Brenner | 60/303 |
| 6,192,677 B1 | * | 2/2001 | Tost | 60/286 |
| 6,279,603 B1 | * | 8/2001 | Czarnik et al. | 137/339 |

FOREIGN PATENT DOCUMENTS

| | | | |
|---|---|---|---|
| DE | 3824954 | | 7/1989 |
| DE | 4436397 | | 4/1996 |
| JP | 09096212 A | * | 4/1997 ............. F01N/3/08 |

* cited by examiner

*Primary Examiner*—Thomas Denion
*Assistant Examiner*—Binh Tran
(74) *Attorney, Agent, or Firm*—Baker Botts LLP

(57) ABSTRACT

An uncontrolled heat pipe (20) is used in a valve seat device (19) for transferring the waste heat from the exhaust gas acting on the metering valve (15) to a condensation zone (21) which is situated in an environment which is at a lower temperature, whereby the metering valve is cooled sufficiently to prevent a chemical change of a reducing agent which otherwise can be caused by high temperatures.

14 Claims, 2 Drawing Sheets

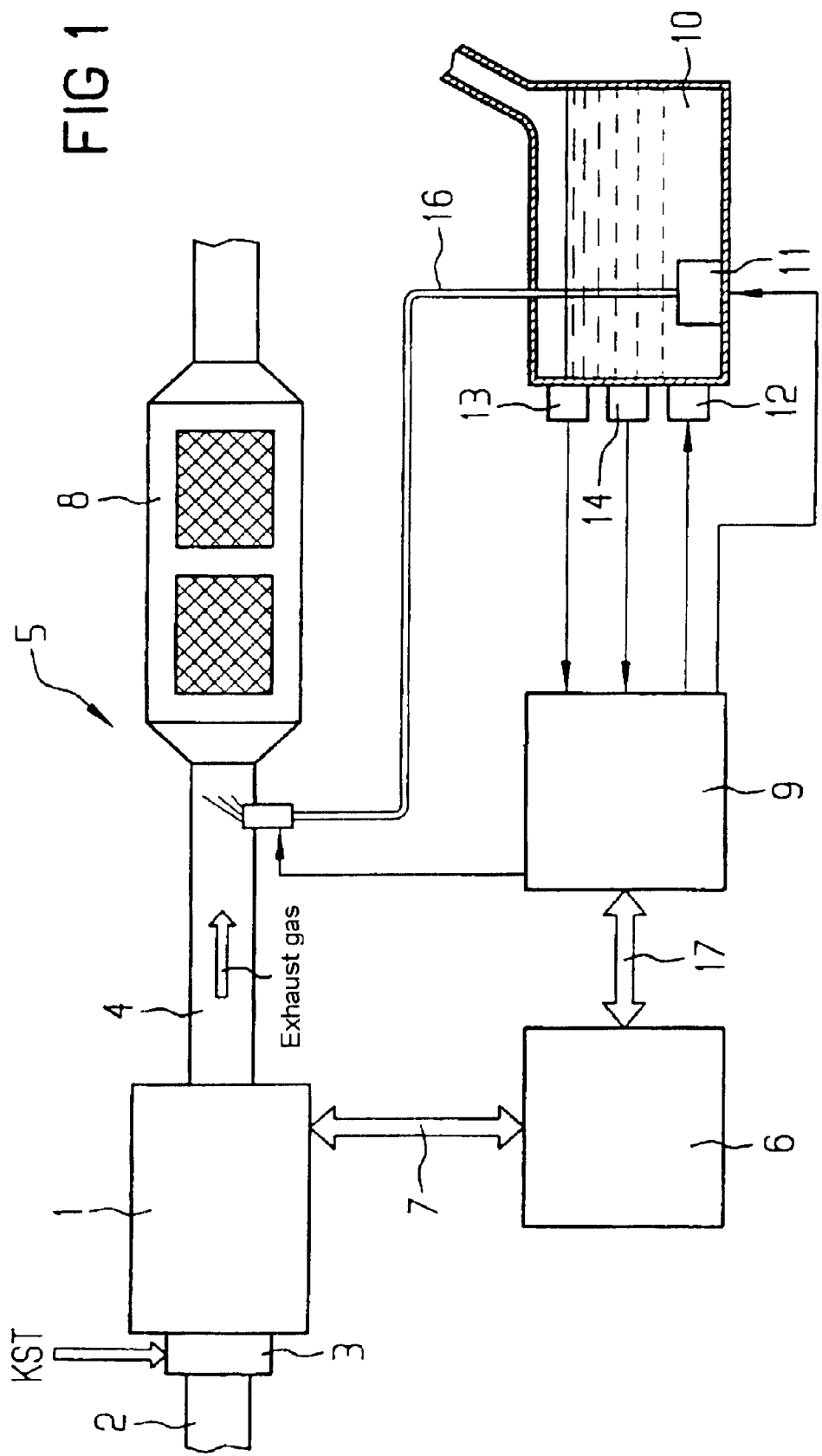

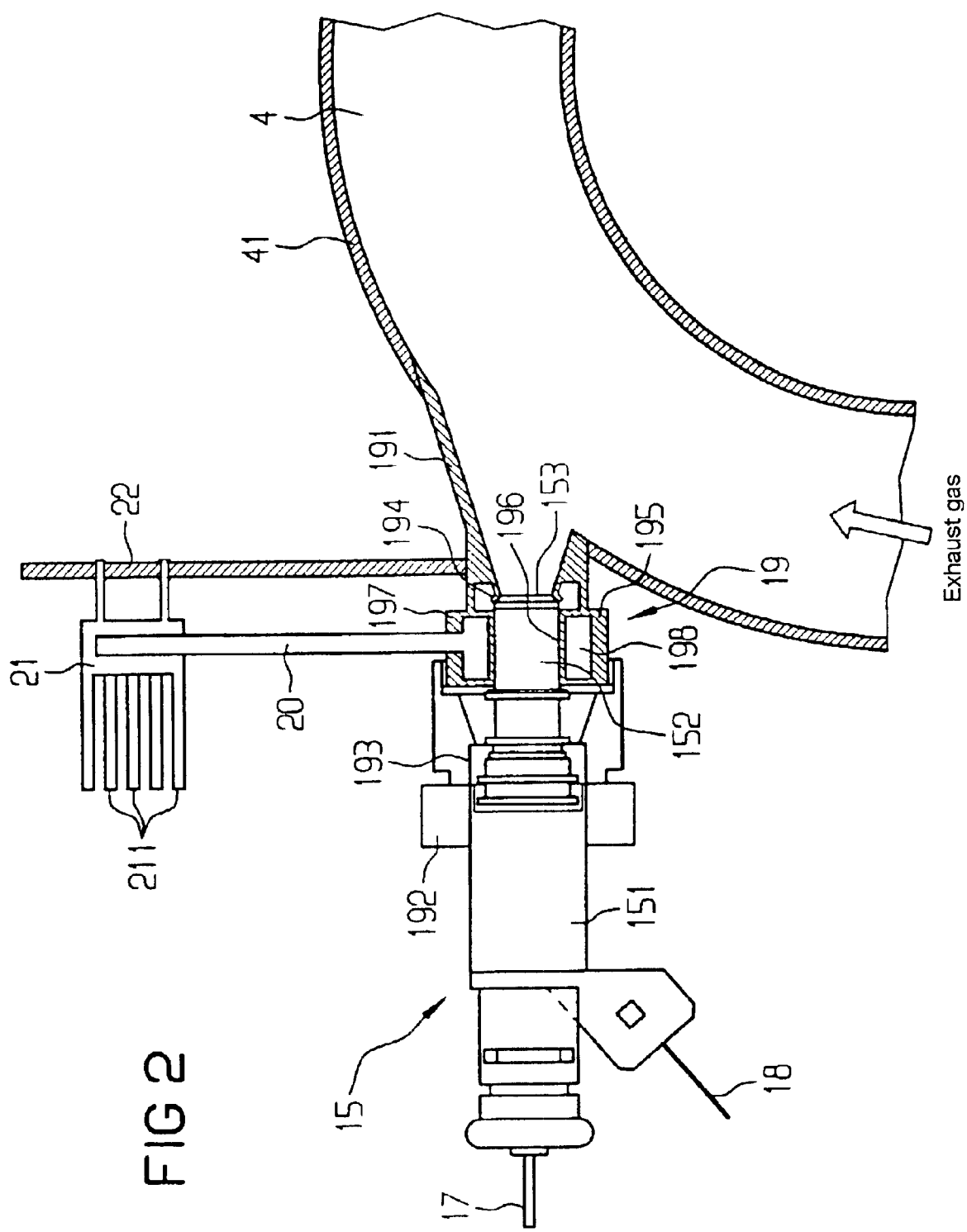

VALVE SEAT DEVICE FOR A METERING VALVE OF AN EXHAUST TREATMENT STATION

FIELD OF THE INVENTION

The invention relates to a valve seat for a metering valve of an exhaust-gas after-treatment system.

BACKGROUND OF THE INVENTION

Diesel internal-combustion engines and lean-burn spark-ignition internal-combustion engines, in which fuel is injected directly into the combustion chamber in the cylinder, have a tendency toward high $NO_x$ emissions because of the high excess of oxygen with which they are operated. The selective catalytic reduction (SCR) process is known to reduce the $NO_x$ content in the exhaust gas from such internal-combustion engines. In this process, a reducing agent is introduced into the exhaust-gas stream at a point upstream of a reduction catalytic converter, with the aid of an electrically driven metering device, and converts the nitrogen oxides contained in the exhaust gas into harmless nitrogen $N_2$ and water $H_2O$ in the presence of oxygen at the reduction catalytic converter. A process of this type is described in the publication "Ein geregeltes Abgasnachbehandlungssystem zur Erfüllung zukünftiger Emissionsgrenzwerte bei Pkw-Dieselmotoren" [A controlled exhaust-gas after-treatment system for meeting future emission limit values in passenger-automobile diesel engines] by Schöppe et al., $17^{th}$ International Vienna Motor Symposium, 1996, Vol. 1. The reducing agent used can be ammonia $NH_3$, but for reasons of its ability to be handled, an aqueous urea solution is normally used. However, it is also possible to use fuel or derivatives as reducing agent.

In such exhaust-gas after-treatment systems, a control device of the internal-combustion engine, or a separate control device, often referred to as a metering control device or $DENO_x$ control device, continuously calculates the desired quantity of reducing agent to be metered on the basis of operating parameters of the internal-combustion engine, such as for example the quantity of fuel introduced into the combustion chamber, the operating temperature and the rotational speed, as well as the temperature of the reduction catalytic converter.

The metering device used in this case is preferably a conventional injection valve, as is used, for example, in a low-pressure gasoline injection system. In accordance with the changed intended use of such an injection valve (metering valve), namely of injecting reducing agent, for example aqueous urea solution, at least those components of the valve which are directly exposed to the urea solution are produced from urea-resistant materials (stainless steel, coated metal, plastic), and the geometry of the outlet opening of the valve is adapted to the quantities to be ejected, which are smaller than when metering fuel.

Since, in SCR systems of this type, the reducing agent is introduced directly into the exhaust gas, the metering valve is attached to the exhaust pipe using a suitable seat device or adapter in such a manner that the jet of liquid penetrates into the hot exhaust-gas stream and is evaporated. The liquid should be prevented from wetting the wall of the adapter or of the exhaust pipe, since in certain temperature ranges this may lead to deposits.

Under unfavorable conditions, the exhaust-gas temperatures at the location of the metering valve may reach more than 500° C. This may have adverse effects on the reducing agent which is to be introduced and even on the metering valve itself.

The use of conventional low-pressure gasoline injection valves is generally permissible only up to a specific temperature, typically about 130° C. The reason for this lies in the coil construction, in particular the insulation of the coils for the electromagnetic drive and the thermal resistances of the materials used, for example in the seals. However, if the injection valve or at least parts thereof are heated above this maximum permissible temperature for a relatively long time, functional disruption or even the complete failure of the injection valve may occur.

When using aqueous urea solution as reducing agent, this substance must not be heated above defined temperature limits (typical upper limit approx. 70° C.) for a prolonged period, since above this critical temperature the urea begins to be converted into other chemical compounds, and effective exhaust-gas after-treatment is no longer ensured.

The adapter which receives the metering valve must therefore allow a high temperature gradient between exhaust pipe and metering valve, so that despite the valve being fitted to the hot exhaust pipe, cooling which is as efficient as possible can be achieved.

DE 44 36 397 A1 discloses that in order to introduce a reducing agent into the exhaust gas fed to the reduction catalytic converter, an electrically controlled metering valve is provided, which is combined with a control valve in a common housing. The control valve is used for the controlled introduction of supplied compressed air, in which a quantity of reducing agent stored via the metering valve is processed and added intermittently to the exhaust gas. The control valve and the metering valve are arranged in a common supporting body, around which cooling water from the cooling-water circuit of the internal-combustion engine flows. Although, by means of such a configuration, the maximum temperature at the end of the injection valve seat can be limited to the cooling-water temperature (max. 90°–100° C.) and the temperature stress on the urea circuit can be relieved, a cooling jacket, lines and hose connections are additionally needed.

DE 38 24 954 A1 describes a cleaning system for the exhaust gases from an internal-combustion engine, with a catalytic converter arranged in a housing, an exhaust-gas line between the internal-combustion engine and the catalytic converter, in which a heat pipe, in its evaporation zone, extracts heat from the exhaust gases fed to the catalytic converter and releases this heat via a condensation zone which lies in an environment which is at a low temperature. In this case, the evaporation zone of the uncontrolled heat pipe is arranged in the exhaust-gas line upstream of the catalytic converter housing.

SUMMARY OF THE INVENTION

The present invention is based on the object of providing a seat device for a metering valve of an exhaust-gas after-treatment system for an internal-combustion engine which is operated with an excess of air. The seat device is of simple structure and minimizes the thermal loading on the metering valve and on the reducing agent. The use of an uncontrolled heat pipe in the valve seat device for transferring the waste heat from the exhaust gas acting on the metering valve to a condensation zone which lies in an environment which is at a lower temperature makes it possible to cool the metering valve and to prevent a chemical change in the reducing agent as a result of the high temperatures.

A cavity in the valve seat device forms a cooling ring which surrounds the metering valve tip. The ring is filled with a liquid and is in flow communication with a heat sink, e.g. a cooling body, which, in order to increase the surface area and therefore the cooling action, is provided with ribs. An arrangement of this type has the advantage that there is no need for a separate coolant circuit or components for active cooling (blower, coolant pump), including electrical or hydraulic elements. It has no moving parts whatsoever; it is completely maintenance-free; and on account of its simplicity can be used at low cost. The heat sink can be integrated into the vehicle without problems since its shape can substantially be matched as desired to installation conditions, and only a relatively small amount of heat has to be dissipated per unit time.

Particularly efficient cooling of the metering valve results if the heat sink is designed as a cooling body which is arranged at a location in the vehicle which is exposed to the flow either of the slipstream or of the air stream of the cooling fan. To increase the cooling capacity, it is also possible to provide a plurality of heat pipes on the valve seat device, and these heat pipes are either all connected to one common cooling body or are each assigned a dedicated cooling body.

Overall, the use of the heat pipe principle results in the simple and inexpensive cooling of the metering valve. The reducing agent is no longer increased to above the critical temperature, and there is therefore no thermal decomposition of the reducing agent.

BRIEF DESCRIPTION OF THE DRAWINGS

The present invention is described in greater detail below with reference to the drawings, in which:

FIG. 1 shows a block diagram of an internal-combustion engine with associated exhaust-gas after-treatment system in which the seat device according to the invention is used; and FIG. 2 shows a diagrammatic illustration of an exemplary embodiment of the seat device according to the invention.

DETAILED DESCRIPTION OF THE INVENTION

FIG. 1 shows, in block diagram and simplified form, an internal-combustion engine which is operated with excess air, together with an exhaust-gas after-treatment system. Only those parts which are needed to gain an understanding of the invention are illustrated. Accordingly, the illustration of the fuel circuit is omitted. In FIG. 1, a diesel internal-combustion engine is shown as the internal-combustion engine, and aqueous urea solution is used as the reducing agent for the after-treatment of the exhaust gas.

The internal-combustion engine 1 is fed the air needed for combustion via an intake line 2. An injection system, which can be designed, for example, as a high-pressure storage injection system (common rail) with injection valves which inject fuel KST directly into the cylinders of the internal-combustion engine 1, is denoted by reference numeral 3. The exhaust gas from the internal-combustion engine 1 passes via an exhaust-gas line 4 to an exhaust-gas after-treatment system 5 and, from there, into the open air via a muffler (not shown).

In order to control and regulate the internal-combustion engine 1, an engine control unit 6 is connected to the internal-combustion engine 1 via a data and control line 7 (diagrammatically illustrated). Signals from sensors (e.g. temperature sensors for intake air, charging air, coolant, load sensor, speed sensor) and signals for actuators (e.g. injection valves, actuating elements) are transmitted between the internal-combustion engine 1 and the engine control unit 6 via the data and control line 7.

The exhaust-gas after-treatment system 5 has a reduction catalytic converter 8 which includes a plurality of catalytic converter units 81, 82 connected in series. In addition, an oxidation catalytic converter can be arranged in each case downstream and/or upstream of the reduction catalytic converter 8. Furthermore, there is a metering control unit 9 which is assigned to a reducing-agent storage container 10 having an electrically drivable delivery pump 11 for the reducing agent.

In this exemplary embodiment as illustrated in FIG. 1, the reducing agent is an aqueous urea solution which is stored in the reducing-agent storage container 10. This container has an electrical heating device 12 and sensors 13, 14 which register the temperature of the urea solution and the level in the reducing-agent storage container 7. The signals from a temperature sensor arranged upstream of the reduction catalytic converter 8 and from an exhaust-gas measuring pick-up, e.g. a $NO_x$ sensor (not shown), arranged downstream of the reduction catalytic converter 8 are also transmitted to the metering control unit 9.

The metering control unit 9 controls an electromagnetic metering valve 15, to which urea solution is fed as required from the reducing-agent storage container 10 with the aid of the delivery pump 11 via a line 16. The injection of the urea solution by means of the metering valve 15 is carried out into the exhaust-gas line 4 upstream of the reduction catalytic converter 8. When the internal-combustion engine 1 is operating, the exhaust gas flows through the exhaust-gas line 4 in the direction of the arrow illustrated.

The metering control unit 9 is connected to the engine control unit 6 via an electrical bus system 17 for the purpose of data transfer between these units. The operating parameters which are relevant to the calculation of the quantity of urea solution to be metered, such as the engine speed, air mass, fuel mass, control travel of an injection pump, exhaust-gas mass flow, operating temperature, charging-air temperature, injection start, etc., are transmitted to the metering control unit 9, via the bus system 17.

On the basis of these parameters and the measured values for the exhaust-gas temperature and the $NO_x$ content, the metering control unit 9 calculates the quantity of urea solution to be injected and transmits a corresponding electrical signal to the metering valve 15 via an electrical connection line 18. As it is injected into the exhaust-gas line 4, the urea is hydrolyzed and thoroughly mixed. The catalytic reduction of the $NO_x$ in the exhaust gas from $N_2$ and $H_2O$ takes place in the catalytic converter units 81 and 82.

The metering valve 15 which is used to introduce the urea solution into the exhaust-gas line 4 is generally a conventional low-pressure gasoline injection valve which is releasably secured in a valve seat device which is fixedly connected to a wall of the exhaust-gas line 4. FIG. 2 shows such a metering valve 15, including the valve seat device 19, in more detail. In FIG. 2, the metering valve 15 is not shown in section, while the valve seat device 19 is shown partially in section. This valve seat device 19 is fixedly connected to the wall 41 of the exhaust-gas line 4 via an outer wall 191; in the case of a metallic valve seat device 19 it is welded to this wall. Alternatively, the valve seat device 19 may consist of ceramic and/or at least those parts of this device which are remote from the exhaust pipe may consist of heat-resistant plastic. The material used should have low thermal conductivity so that as little heat as possible is transferred from the exhaust gas and the exhaust-gas line 4 to the metering valve 15; and should have a sufficiently high mechanical strength to receive the metering valve 15 and also to hold it securely when the internal-combustion engine 1 is operated.

The metering valve 15 is fitted into the valve seat device 19 and is held securely by means of a suitable screw connection or clamping device 192, so that the metering valve 15 is centered in the radial and axial directions. On the side which is remote from the exhaust-gas line 4, the valve seat device 19 has a recess 193 which matches the diameter of the metering valve body 151, so that in the inserted position the metering valve tip 152 lies with its outlet opening 153 just before or level with the wall 41 of the exhaust-gas line 4 which is provided with an opening for the passage of the urea solution. The metering valve tip 152 is sealed with respect to the exhaust gas against a cone 194 formed integrally in the valve seat device 19.

To dissipate the heat emanating from the exhaust gas, and therefore to cool the metering valve 15, the part of the valve seat device 19 which surrounds the metering valve tip 152 is designed as a heat-exchange casing. A cooling ring 197, which is defined by an outer wall 195 and an inner wall 196, is provided. The inner wall 196 is in direct physical contact with the surface of the metering valve tip 152 and thus forms a heat-exchange wall. The cavity 198 of the cooling ring 197 is filled with a liquid medium. To achieve an improved heat transfer between metering valve tip 152 and cooling ring 197, it is also possible for an interlayer, e.g. a foil, to be inserted.

A heat pipe 20 has one side in flow communication with the cavity 198 in the cooling ring 197, and the other side ends in a cooling body 21. The heat pipe 20 is arranged within the vehicle driven by the internal-combustion engine at a spatial distance from the metering valve 15 and the exhaust-gas line 4. The cooling body 21 is attached to a shielding plate 22 which is fixedly connected to the valve seat device 19, or to the exhaust-gas line 4, and as such keeps the radiant heat of the hot exhaust-gas line 4 away from both the heat pipe 20 and the cooling body 21. This arrangement ensures that the valve seat device 19, the heat pipe 20, the cooling body 21 and the exhaust pipe 4 form a structure which is suspended resiliently with respect to the vehicle body and is capable of vibration.

To increase the surface area and therefore to provide improved cooling, the cooling body 21 has a plurality of cooling ribs or cooling fins 211. To increase the cooling action, it is also possible for the cooling body 21 to be arranged in the vehicle at a location at which it is exposed either to the slipstream or to at least part of the air stream of a fan which is present for the purpose of cooling the internal-combustion engine 1. It is also possible to provide a plurality of heat pipes 20 which are preferably parallel to one another, are all connected to the cooling ring 197 and open out either into a common cooling body or, depending on the number of heat pipes 20, into a plurality of cooling bodies 21.

If the reducing agent is an aqueous urea solution, the liquid selected for the heat pipe 20 is a cooling medium which boils with a high heat of evaporation at approximately 60° C. and the pressure which is established at this temperature. The boiling operation and the heat of evaporation consumed for this purpose means that the cooling ring 197 around the metering valve tip 152 is cooled very efficiently. The evaporated cooling medium condenses, releasing the heat of evaporation, in the heat pipe 20, which projects into the cooling body 21, and flows back into the cooling ring 197 in the valve seat device. On account of its thermal properties, water is an eminently suitable cooling medium, since its boiling point, at a pressure of approx. 0.2 bar, lies in this temperature range, and water has a relatively high heat of evaporation.

The present invention is not intended to be limited by the foregoing detailed description which includes various preferred features and embodiments, modifications of which will be apparent to those skilled in the art and are understood to be well within the scope of the present invention.

What is claimed is:

1. A valve seat for receiving a metering valve for the controlled introduction of a liquid reducing agent into exhaust gas from an internal-combustion engine and upstream of a reduction catalytic converter, the valve seat having a device for cooling the metering valve, comprising at least one uncontrolled heat pipe filled with liquid and having an evaporation zone and a condensation zone, wherein the evaporation zone extracts heat supplied by the exhaust gas from the metering valve at its end which expels the reducing agent and releases heat by condensation to a cooling body which is located at a distance from the metering valve and in a lower temperature environment.

2. The valve seat according to claim 1 wherein the device further comprises a cavity formed by an outer wall and an inner wall, and wherein the inner wall surrounds at least part of the metering valve to form a heat-exchange wall, and wherein the cavity is filled with a liquid and is in flow communication with the cooling body via the heat pipe.

3. The valve seat according to claim 1, further comprising a plurality of heat pipes having a common evaporation zone and which are connected to a cooling body.

4. The valve seat according to claim 3, wherein each of heat pipe is assigned to a dedicated cooling body.

5. The valve seat according to claim 1, wherein the cooling body is located to permit an airstream generated in or by a vehicle equipped with an internal-combustion engine to flow onto its surface.

6. The valve seat according to claim 1, wherein the heat pipe is filled with a liquid, the boiling point of which is slightly below the critical temperature of the reducing agent which is to be introduced using the metering valve.

7. The valve seat according to claim 6, wherein the heat pipe is filled with water.

8. The valve seat according to claim 1, wherein the evaporation zone is a cooling ring which surrounds the said end of the metering valve.

9. The valve seat according to claim 8, wherein an interlayer is positioned between the cooling ring and the metering valve end.

10. The valve seat according to claim 1, wherein the cooling body is mounted on a shielding plate which provides a shield from radiant heat of a hot exhaust-gas line.

11. The valve seat according to claim 1, wherein the metering valve is secured in the valve seat device to prevent axial and radial displacement.

12. The valve seat according to claim 1, wherein the valve seat device comprises metallic materials.

13. The valve seat according to claim 1, wherein the valve seat device comprises ceramic material.

14. The valve seat according to claim 1, wherein the valve seat device is at least partially comprised of heat-resistant plastic material.

* * * * *